United States Patent
Tse et al.

(10) Patent No.: US 9,122,850 B2
(45) Date of Patent: Sep. 1, 2015

(54) ALTERNATE GAME-LIKE MULTI-LEVEL AUTHENTICATION

(71) Applicant: Xerox Corporation, Norwalk, CT (US)

(72) Inventors: Francis Kapo Tse, Rochester, NY (US); Zahra Langford, Rochester, NY (US); Jennifer Watts-Englert, Pittsford, NY (US); Catherine McCorkindale, Fairport, NY (US); David Russell Vandervort, Walworth, NY (US); Mary Ann Sprague, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 257 days.

(21) Appl. No.: 13/759,369

(22) Filed: Feb. 5, 2013

(65) Prior Publication Data

US 2014/0223547 A1    Aug. 7, 2014

(51) Int. Cl.
    *G06F 21/31*      (2013.01)
    *G06F 21/46*      (2013.01)

(52) U.S. Cl.
    CPC ............... *G06F 21/31* (2013.01); *G06F 21/46* (2013.01); *G06F 2221/2109* (2013.01); *G06F 2221/2113* (2013.01); *G06F 2221/2147* (2013.01); *G06F 2221/2149* (2013.01)

(58) Field of Classification Search
    CPC . G06F 21/31; G06F 21/46; G06F 2221/2149; G06F 2221/2113; G06F 2221/2147; G06F 2221/2109

USPC .......... 726/1, 2, 12, 18, 19; 713/152
See application file for complete search history.

(56) References Cited

U.S. PATENT DOCUMENTS

| | | | |
|---|---|---|---|
| 8,245,305 B2 * | 8/2012 | Mochizuki | 726/26 |
| 8,370,926 B1 * | 2/2013 | Satish | 726/19 |
| 8,590,018 B2 * | 11/2013 | Thavasi et al. | 726/4 |
| 8,707,453 B2 * | 4/2014 | Ivey | 726/28 |
| 8,789,139 B2 * | 7/2014 | Picard | 726/2 |
| 8,881,251 B1 * | 11/2014 | Hilger | 726/7 |
| 2006/0136997 A1 | 6/2006 | Telek et al. | |
| 2010/0058437 A1 * | 3/2010 | Liew et al. | 726/2 |
| 2011/0197263 A1 | 8/2011 | Stinson, III | |
| 2012/0069131 A1 * | 3/2012 | Abelow | 348/14.01 |
| 2012/0304269 A1 | 11/2012 | Rodriguez et al. | |

* cited by examiner

*Primary Examiner* — Mohammad A Siddiqi
(74) *Attorney, Agent, or Firm* — Richard H. Krukar; Kermit D. Lopez; Luis M. Ortiz

(57) ABSTRACT

The disclosed embodiments provide a convenient way for users to access segregated work spaces on mobile devices. A game-like multi-level interactive approach is used to prompt users for input to verify their identity. Multiple identity verification attributes can be collected at each level of interaction. Authentication is achieved when a settable level of user identification confidence is reached. This can potentially reduce the amount of interaction needed as compared to requiring a user to type in a long, cryptic password.

19 Claims, 7 Drawing Sheets

| SUBSET 1 | ALL GAMES | ADULT GAMES | TEEN GAMES | CHILD GAMES |
|---|---|---|---|---|
| SUBSET 2 | TEEN OK | TEEN GAMES | BROWSING | |

| USER 1 | CONFIGURATION | ALL GAMES | BANKING | SHOPPING |
|---|---|---|---|---|
| CONFIDENCE 1 | 1.00 | 0.80 | 1.00 | 0.90 |
| USER 2 | TEEN OK | | | |
| CONFIDENCE 2 | 0.70 | | | |
| USER 3 | TEEN OK | SHOPPING | | |
| CONFIDENCE 3 | 0.70 | 0.90 | | |
| USER 4 | CHILD GAMES | | | |
| CONFIDENCE 4 | 0.50 | | | |

…

ALTERNATE GAME-LIKE MULTI-LEVEL AUTHENTICATION

FIELD OF THE INVENTION

Embodiments are related to computer security, computer games, and authentication.

BACKGROUND

Mobile devices, such as smart phones and tablets, are often shared among several users, especially if they are used in a family setting or owned by a school for general usage. The trend is to have some form of data segregation and a corresponding "log-in" process to confirm user identification to allow access to the correct data. In an environment where some of the users are young, it is hard to train them to use a log-in name and password. Also, a device may just be "lying around" when a young user happens to "find it" and could be allowed to access other people's data. The level of achievable security is usually a tradeoff between the convenience and complexity of data protection process. In many instances it is good to allow a young user, or any other user, to log onto a device but to only have access to what is appropriate to that particular user. Systems and methods providing for different people, including children, to access a device at a level that is appropriate for the user are needed.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

Aspects of the embodiments address limitations and flaws in the prior art by providing alternate log-in capabilities to a device having numerous levels of access.

It is, therefore, an aspect of the embodiments to provide challenges that can be responded to by drawing something or making a gesture. A user's profile can be created, in part, by recording and storing that user's responses to the challenges. Later, the user can be authenticated by again presenting challenges, again recording responses, but comparing the new responses to the stored responses.

A user profile can be generated for a registrant by obtaining a user identifier from the registrant and offering the registrant the option of using password authentication, non-password authentication, or both. If the registrant wants to use non-password authentication, then a series of challenges can be presented. The challenge responses can be drawings or gestures. A very simple example of a challenge is "How many pebbles are there?" In some embodiments, the registrant draws the correct number on a touch screen to produce a drawing. In other embodiments, the registrant can gesture the correct number in the air. If the correct answer is "3", then the drawing or gesture can be the Arabic numeral, a set of three strokes, or some another challenge response that the registrant desires. Note that an adult may want to oversee a child registrant's challenge responses and ensure that the numeral "3" matches three pebbles. Current technology provides a plethora of devices that can record and analyze both gestures and drawings.

Once a user profile exists for the registrant, a person can attempt to authenticate themselves to the device. Ideally, a person who is not a registrant would be denied access. The person can begin the authentication process by supplying a user identifier. The user identifier can be used to retrieve previously recorded challenge responses that are associated with that user identifier. The person can then be given challenges with the challenge responses being recorded. Drawing and gesture based authentication is unlike password authentication because passwords either completely match or they don't. Drawings and gestures, however, can be similar but will very rarely be exact matches of previous drawings or gestures. In fact, an exact match between a newly recorded drawing or gesture and a previously recorded one can indicate that someone is trying to spoof the authentication. More generally, a degree of similarity can be calculated between a previously recorded challenge response and a newly recorded one. Enough similarity indicates that the responses are the same and the person is authenticated as being the registrant.

BRIEF DESCRIPTION OF THE FIGURES

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION OF THE INVENTION

Figure 1:
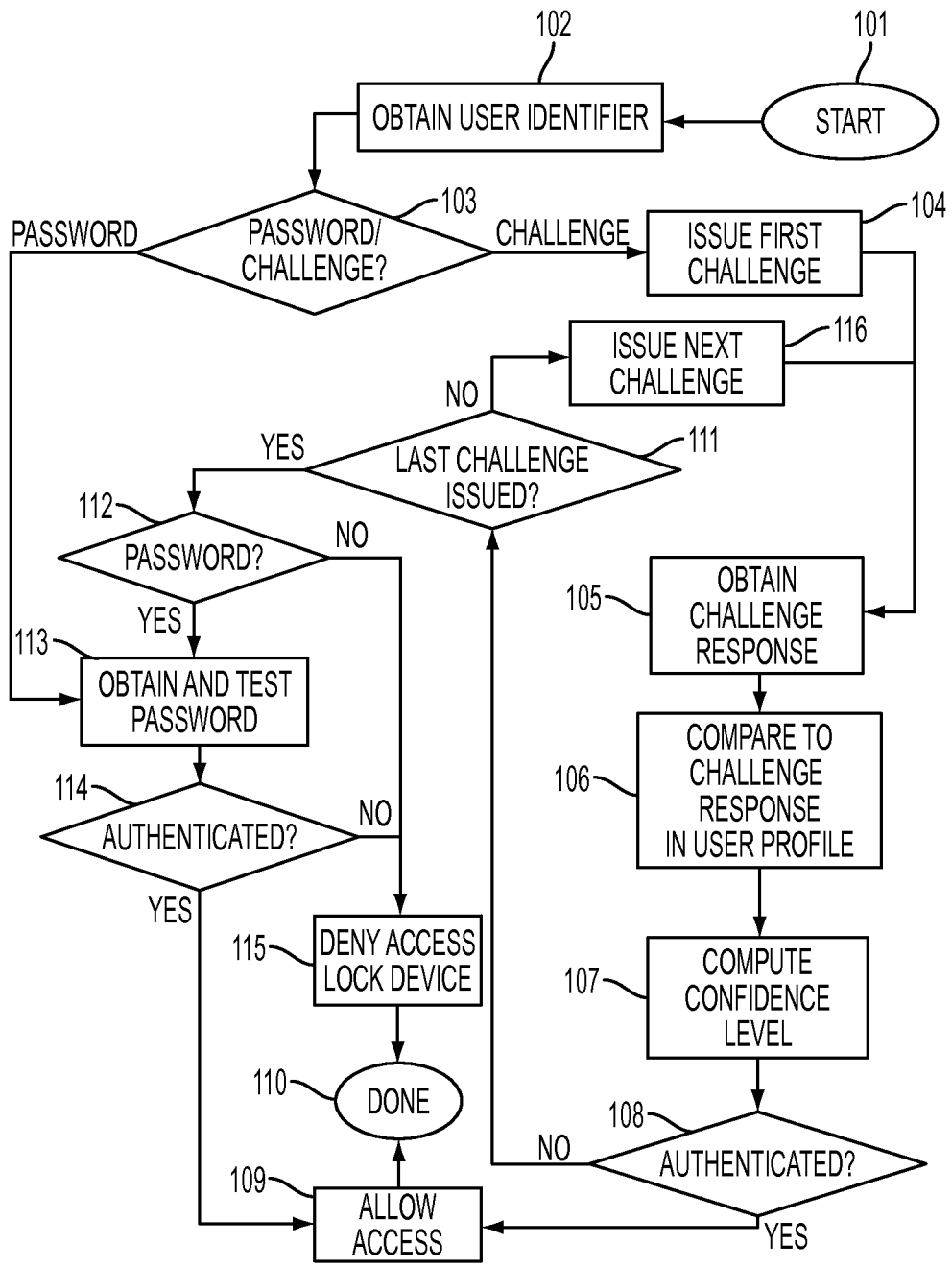
FIG. 1 illustrates a high level flow diagram of authenticating a person in accordance with aspects of the embodiments.

The particular values and configurations discussed in these non-limiting examples can be varied and are cited merely to illustrate embodiments and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The disclosed embodiments are described in part below with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The disclosed embodiments provide a convenient way for users to access segregated work spaces on mobile devices. A game-like multi-level interactive approach is used to prompt users for input to verify their identity. Multiple identity verification attributes can be collected at each level of interaction. Authentication is achieved when a settable level of user identification confidence is reached. This can potentially reduce the amount of interaction needed as compared to requiring a user to type in a long, cryptic password.

Mobile devices such as smart phones and tablets typically do not require a user to login to use them. In other words, when you pick up your phone, you expect it to just work, without any need for authorization. However, when the devices are used in a shared environment such as at home or when the device is used by group of students and teachers in a school setting, there might be a need to restrict access to certain data or even have separate accounts for each user. While adding accounts on mobile devices seems like a good approach to protect users from accessing each other's data, in practice, it is a big hindrance and can be difficult to carry out from the user's perspective. For example, typical security policies require a log-in to time-out when a device is not in use and long passwords with uppercase letters and minimum numerical elements are often required. Also, to provide additional security, passwords often have to be changed periodically, thereby adding to the annoyance to the user. Furthermore, it is difficult to train young users to log-in and log-out of accounts which can be particularly annoying with a mobile device that, unlike a PC or laptop, is so easily passed around. Additionally, these legacy kinds of setup require users to remember to log-out of their account whenever they share the device, and then log back in whenever the device is returned.

Another issue is that separate accounts as typically implemented do not support most people's natural usage behavior. Typically these devices are shared fluidly between people. For example, parents often allow their kids to use their phone or tablet while they are driving, waiting in line, or in a restaurant. Logging in and out of separate accounts can be a barrier to sharing the device in these kinds of situations. The disclosed embodiments use the built-in capabilities of modern mobile devices to make authentication easier to use even for younger users.

A User Identity Verifier (UIV) can authenticate a user. The UIV can present a person with user-specific verification methods that were chosen during the user account set-up process, aka registration. Users can choose to use the traditional way of entering a password or an alternative game-like multi-level authentication scheme.

The game-like multi-level authentication scheme is a sequence of challenges that are answered by drawing or using a finger to write out a response. Younger users may find this a more appealing way to access the device; older users may find this easier and more interesting than password access. Examples of challenges include: "Draw your favorite animal", "What is your favorite shape?", "What is your favorite number?", "Name this animal"; and "How many pebbles are in the bowl?"

Through the process of getting input from a user in the form of "written" gestures or drawings, a vector of input parameters can be collected to compare against expected results. Each set of matches in input parameter for a particular challenge will be added together to generate an aggregated level of confidence that a user identity has been verified. The challenges can be randomized and the challenged responses can terminate as soon as a threshold of confidence has been reached.

The following are some response parameters that can be collected:

1. Expected static image from the responses that were recorded for the user, e.g., picture of the animal, name entered, shape of the numbers, color used (especially when drawing an animal or shape), etc.;
2. Sequence and trace of the movement used to input the response, e.g., drawing a circle clockwise vs. counterclockwise, how an animal was drawn, how a square was drawn (as a sequence of lines or in a continuous movement), etc.;
3. Speed at which different parts of the image were drawn;
4. Motion detected by the accelerometer (rather than interacting with the screen, the user could instead wave the phone in a specific pattern as a response to a challenge.); and
5. Addition of sound input while drawing—"mooing" while drawing a cow, saying the numbers out loud while drawing them, calling the shape out while drawing them, making other "funny" sound while drawing any responses, etc.

Potentially, a great deal of identification information can be conveyed with a single input, resulting in an easier way to perform identity verification rather than remembering a long typed-in password. In some cases, even adults might find the alternate use of UIV a more intuitive way to verify identity than using a password.

A manual verification process will be provided as a means of overriding the UIV in case it fails to correctly authenticate a known user. A traditional way of entering a user name and password that was set up when the account was created can be used.

The system should have a process for the owner of the device to unlock the device using a master unlocking process. This process can be used if the owner forgets a password, or if the alternative UIV is not working out. The process can be initiated by a specific action (pushing two buttons at the same time, shaking the device, etc.). Once the process is initiated, the owner can enter a master password, or the device can issue a series of pre-specified challenges that verify the identity of the person who is claiming to be the device owner.

FIG. 1 illustrates a high level flow diagram of authenticating a person in accordance with aspects of the embodiments. After the start 101, a user identifier is obtained 102. The user identifier can be a user name which is typically a string of characters such as alphanumeric characters and punctuation. The user identifier can alternatively be a gesture or drawing, a picture obtained from the devices camera (presumably a picture of the person), a thumbprint, or another input obtained using the device's input hardware.

A decision to use a standard password or challenge authentication is made as indicated at decision block 103. The decision itself can be input from the user, can be obtained from the user's user profile, or can be a device default (in which case a user input can override the default). If password authentication is to be used, then a password can be obtained and tested as depicted at block 113. If the user is authenticated as shown at block 114, then the user is allowed to access the device as illustrated at block 109 and the authentication process is completed as indicated at block 110. If the user is not authenticated as described at decision block 114, then access is denied access as shown at block 115 and the device locked if configured to do so.

If challenge authentication is to be used, then the first challenge can be issued as shown at block 104 and a challenge response obtained from the user as indicated at block 105. The challenge response is then compared to the challenge response stored in the user profile as described at block 106. The challenge response can be a drawing or a gesture. In general, a drawing can be obtained when the user traces a figure on a touchpad or similar sensitized drawing surface. Part of the drawing process can include selecting a color. In general, a gesture can be obtained when the user moves the device itself (such as a smartphone with accelerometers) or motions in front of the device's camera. Challenge responses can be saved as a bit map, vector map, vector histogram, or in some other format. A vector map can indicate the direction of movement over time or as a function of position. A vector histogram can indicate the amount of time or the number of pixels during which the input (gesture, finger on touch pad, etc.) is moving in a particular direction. The comparison operation is unlikely to find a perfect match, but can calculate the correlation between the stored challenge response and the newly obtained challenge response.

A confidence level is then computed as indicated at block 107. In many embodiments, the confidence level is not the same as the previously calculated correlation, but can instead be calculated from the correlations obtained from a number of challenge responses. For example, a user's first response might be very highly correlated with the stored response. In such a case the confidence level could be very high based on that single excellent response. If the confidence level is high enough, the user is authenticated as shown at block 108 and allowed access to the device as illustrated at block 109.

If the confidence level is not high enough, the user can be issued additional challenges. If all the challenges have been issued as illustrated at decision block 111, then the process can check if a password option is available or enabled as indicated at decision block 112. If so, password authentication can be attempted as depicted at block 113. If more challenges remain as illustrated at decision block 111, the next challenge can be issued as shown at block 116 and the process continues as before to compute the confidence level as described at block 107. After the first challenge, the confidence level can be an average of the correlations, a weighted sum, incremented for each correlation above a threshold, decremented for each correlation below a threshold, or some similar algorithm that adapts the confidence level up or down based on the successive challenge responses.

Some embodiments can provide a person with the opportunity to switch authentication methods by pressing a key or selecting an input field on the device. As such, the person doesn't have to quickly fail or bypass each challenge to reach a default password authentication opportunity if such is provided.

Yet another opportunity provided by a challenge/response authentication capability is that of resetting passwords. Current techniques use questions like "Where did you first go to school?" Game-like challenges can be used for a similar purpose but with greater security because a person's gestures or drawing style cannot yet be looked up online.

Figure 2:
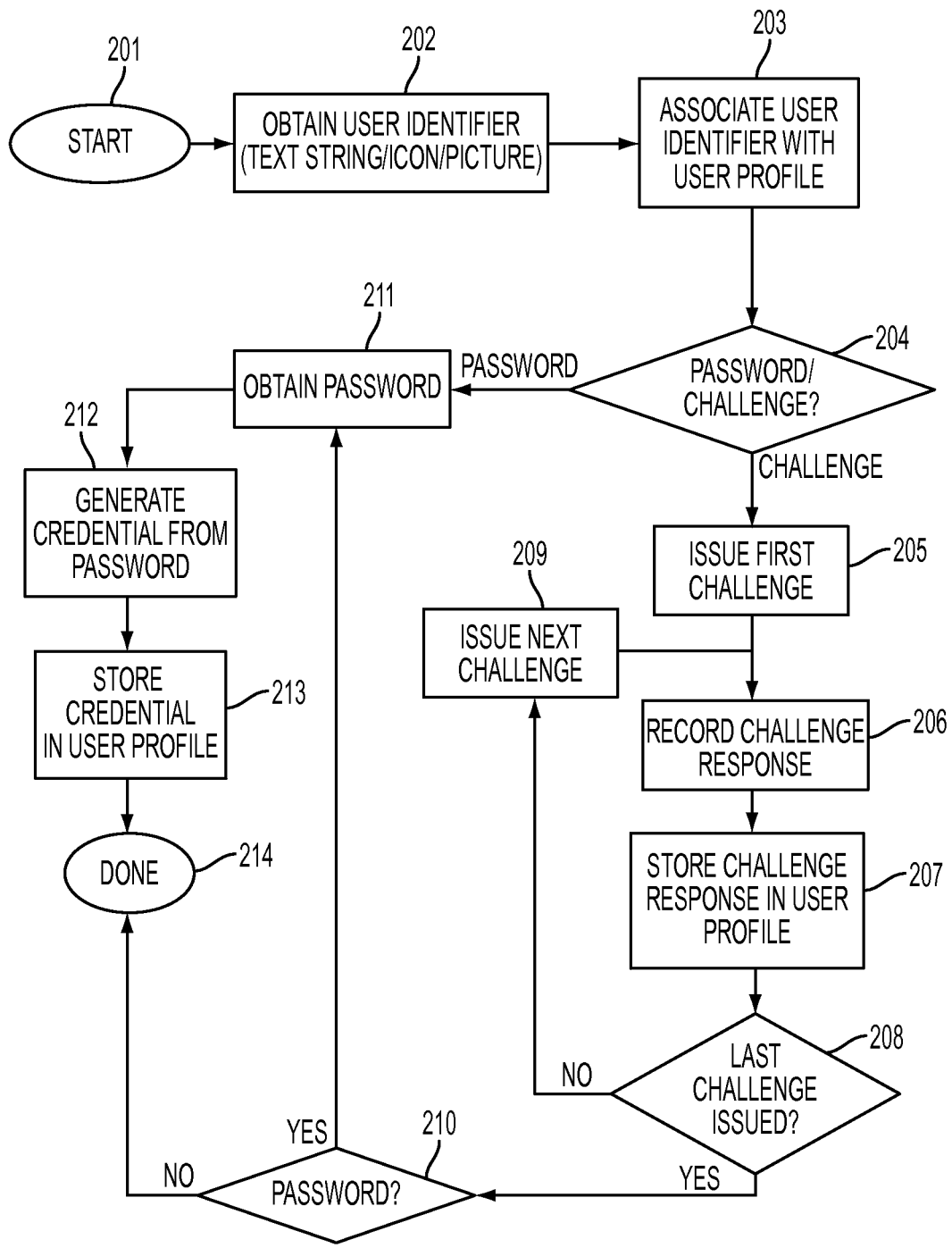
FIG. 2 illustrates a high level flow diagram of creating a user profile for a registrant in accordance with aspects of the embodiments.

FIG. 2 illustrates a high level flow diagram of creating a user profile for a registrant in accordance with aspects of the embodiments. After the start as indicated at block 201, a new user identifier can be obtained as described at block 202 and then associated with a new user profile, as illustrated at block 203. In some embodiments, the registrant can select password based authentication or challenge based authentication as indicated at decision block 204. If password authentication is selected, then a password can be obtained as illustrated at block 211, a credential generated from the password as shown at block 212, and the credential stored in the user profile as depicted at block 213. Hackers and computer system administrators are familiar with storing credentials instead of passwords because storing a password itself, without some modification, is a security risk.

If the registrant has selected challenge authentication as depicted at block 204, the first challenge is issued as illustrated at block 205 and the registrant's response is recorded as described at block 206. The response can be stored directly in the user profile as shown at block 207 or can be converted into a credential. If challenges remain to be issued 208, then the next challenge is issued as depicted at block 209 and the response recorded and stored as before. If no more challenges remain, then a password can optionally be entered as well as illustrated at decision block 210.

Figure 3:
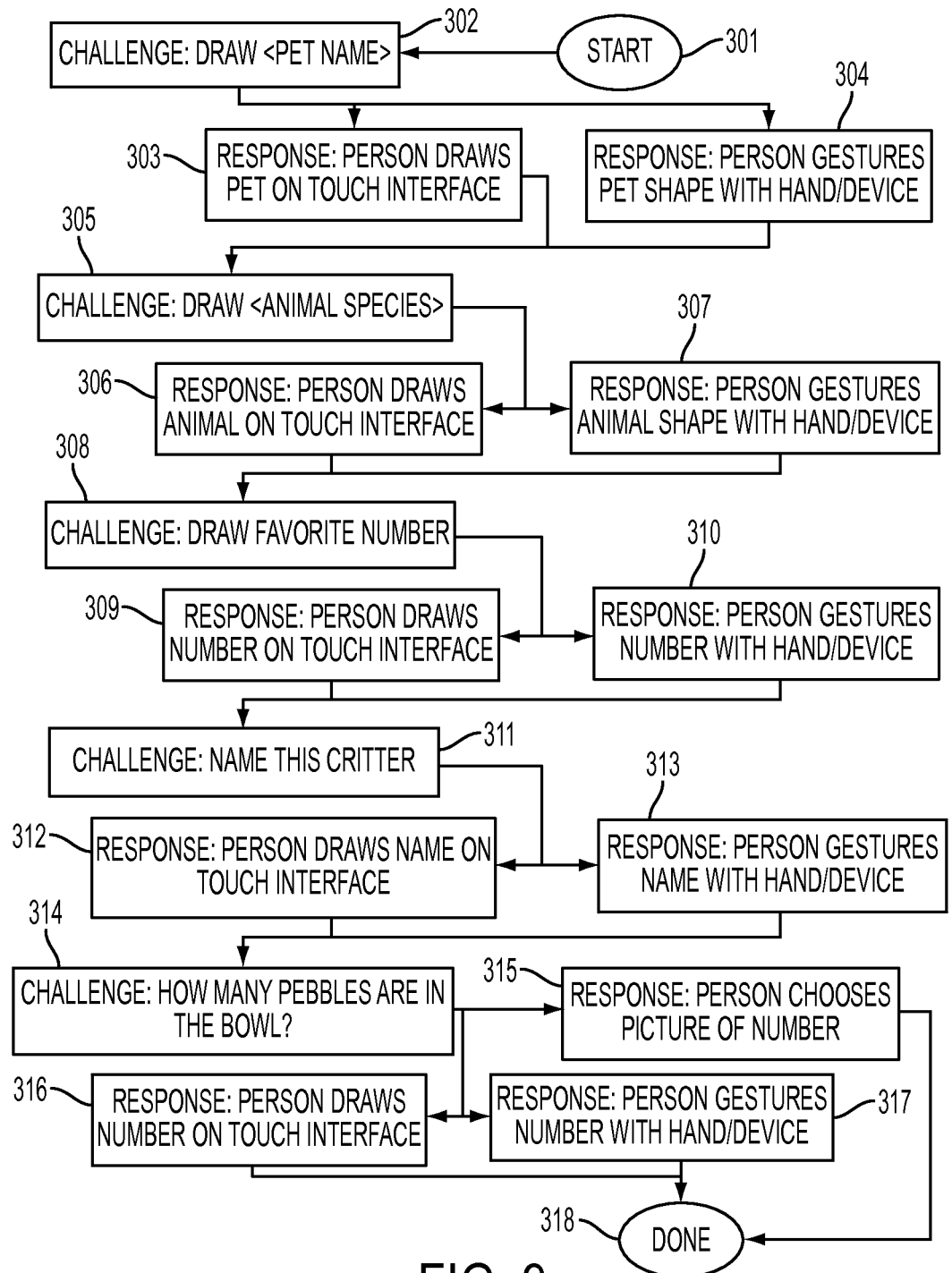
FIG. 3 illustrates a high level flow diagram of issuing challenges and receiving responses in accordance with aspects of the embodiments.

FIG. 3 illustrates a high level flow diagram of issuing challenges and receiving responses in accordance with aspects of the embodiments. The challenges and responses are here intended to be exemplary and to indicate various challenges and responsive inputs. After the start as depicted at block 301, the user is challenged to draw a pet such as a dog, cat, fish, etc., as indicated at block 302. Here, the pet is specified by the individual pet's name. The user can respond, based on the device's capabilities, by drawing as illustrated at block 303 or gesturing as shown at block 304. The user can then be challenged to draw a type of animal as depicted at block 305 and the response can be a drawing as described at block 306 or gesture as illustrated at block 307. The user can then be challenged to draw a favorite number as depicted at block 308 and the response can be a drawing as indicated at block 309 or gesture as described at block 310. The user can then be challenged to name an animal displayed on the device as depicted at block 311, the animal can be a pet with a given name or type with a species name. The user's response is, as always, whatever the user decides is the correct response. That response can be a drawing as shown at block 312 or gesture as depicted at block 313.

Eventually, the user can be challenged to state how many pebbles are in a bowl as shown at block 314 and the response can be a drawing as indicated at block 316, gesture as described at blocks 317, or a picture of a number as illustrated at block 315. Note that the picture of pebbles in a bowl can have multiple bowls such that selecting the correct bowl is part of the challenge. Alternatively, in response to a challenge such as "How many pebbles?" the user can respond with the number in a certain one of numerous pictured containers, the number in a single container amongst many, the number of a certain color, the number outside the container, etc. Interestingly, a color blind person can choose only those pebbles that appear differently colored to others but same colored to that particular person. Other game-like challenges include coloring in squares based on audible or visible coaching, playing tic-tac-toe, and imitating animal sounds. With respect to animal sounds, those practiced in phone/tablet/HHD programming are aware that software services and libraries are available for comparing sounds.

Figure 4:
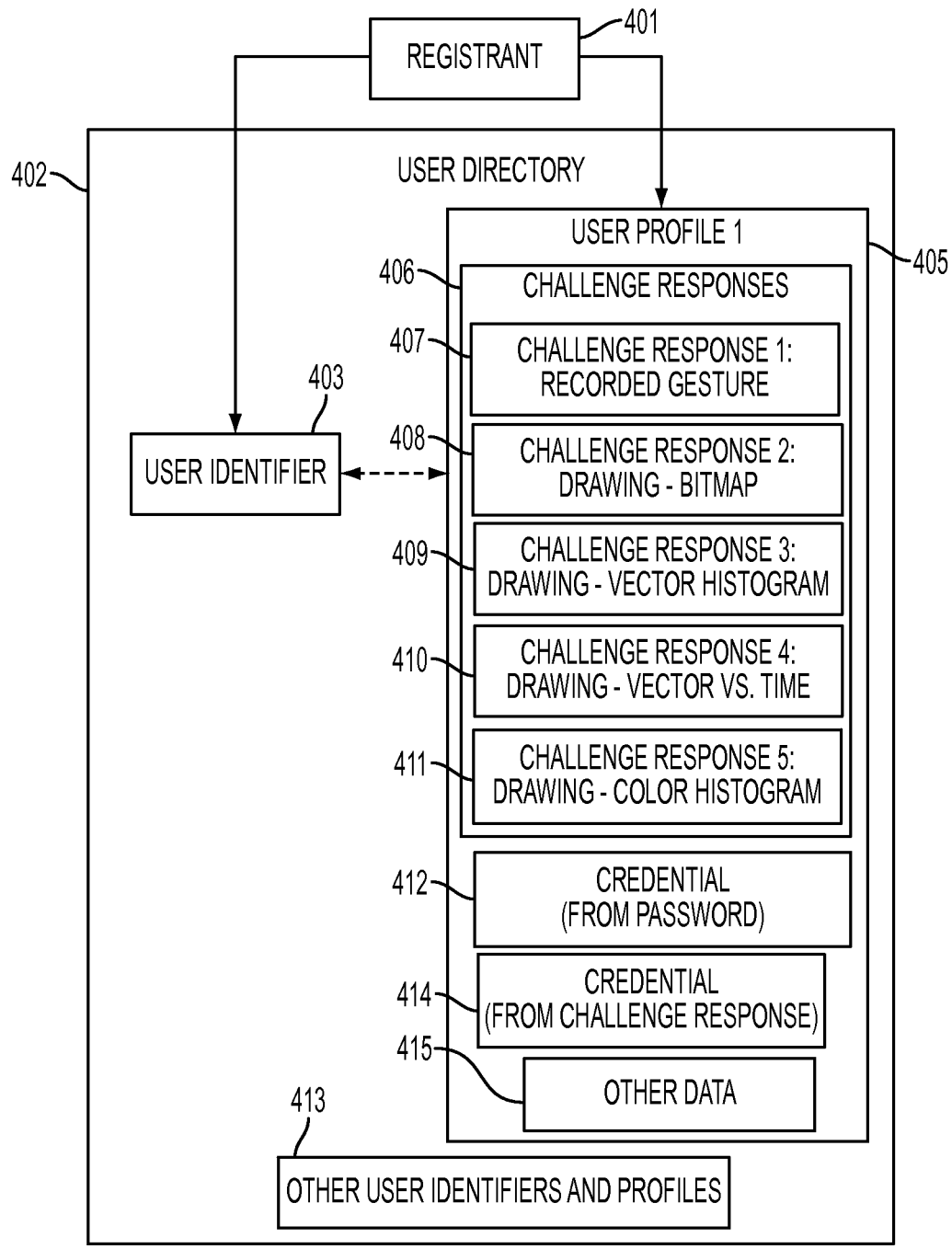
FIG. 4 illustrates a user directory storing user identifiers in association with a user profile in accordance with aspects of the embodiments.

FIG. 4 illustrates a user directory 402 storing user identifiers in association with a user profile in accordance with aspects of the embodiments. User directories are typically used to ease the administrative burden of user management by centralizing the storage of user authentication information. User information associated with a registrant 401 can be stored in the user directory 402 with the registrant's user identifier 403 associated with the registrant's user profile 405. The user data for other registrants 413 can also be stored in the directory 402.

The user profile 402 includes a variety of data and can include all or some of the data indicated in FIG. 4. The user profile 405 can include challenge responses 406 such as recorded gestures 407, bitmaps 408, vector histograms 409, vector vs. time recordings 410, color histograms 411, and other types of recordings of registrants' responses to challenges. The challenge responses can be stored as credentials 414. The user profile can also include credentials from passwords 412 and other data 415.

Figure 5:
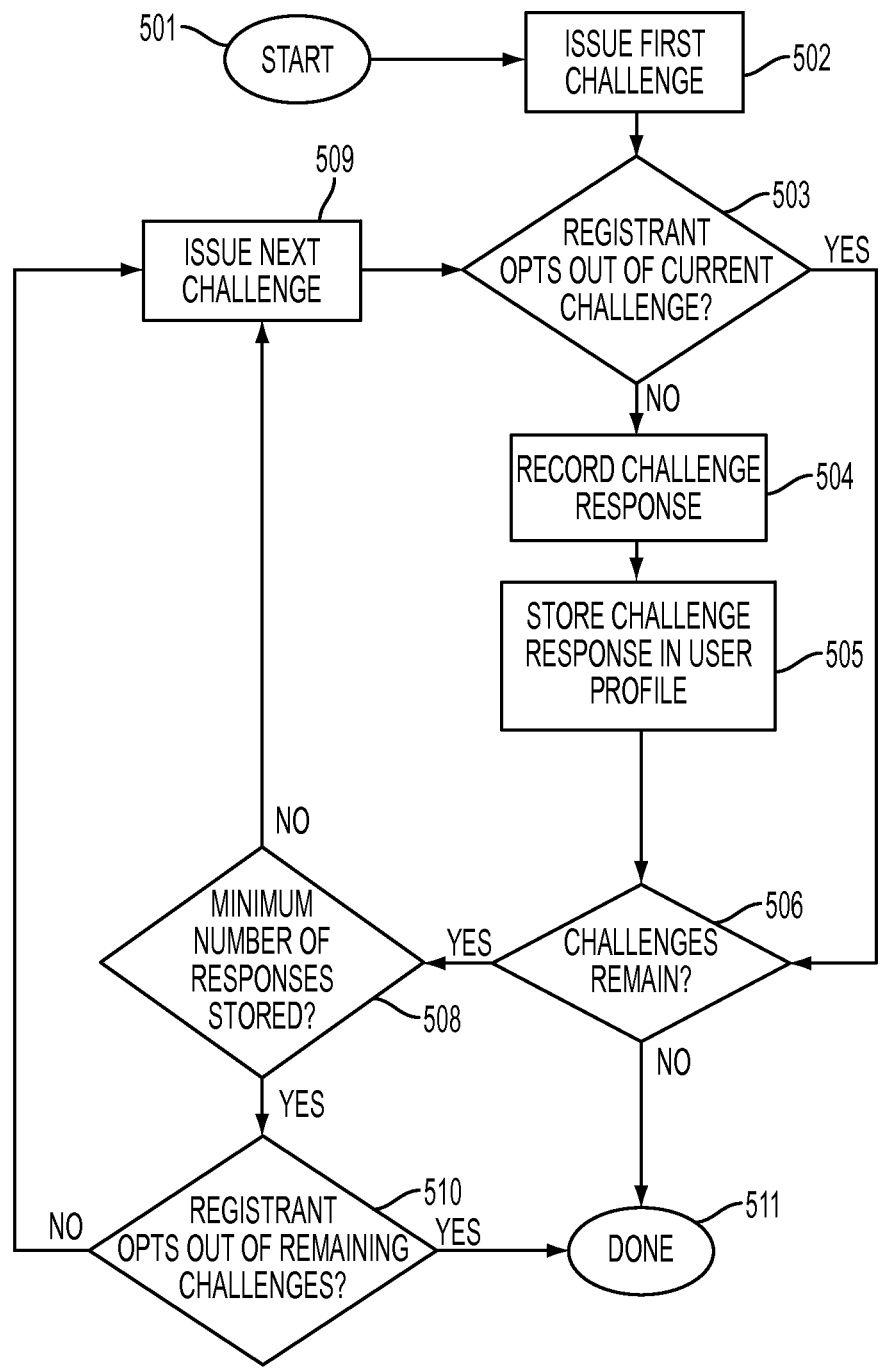
FIG. 5 illustrates a high level flow diagram wherein a user can opt out of responding to some of the challenges in accordance with aspects of the embodiments.

FIG. 5 illustrates a high level flow diagram wherein a user can opt out of responding to some of the challenges in accordance with aspects of the embodiments. After the start 501, the first challenge is issued 502. The registrant is also provided with an option to opt out of the challenge. If the registrant does not opt out 503, then the process of the registrants challenge response is recorded 504 and stored in that registrant's user profile 505. If the registrant opts out, then response recordation and storage is skipped. If no more challenges remain 506, then the process is done 511. Otherwise, if the registrant has not responded to a minimum number of challenges and the responses stored 508, then the next challenge is issued 509 and the process loops back to checking for an opt-out 503. If enough challenge responses have already been recorded and stored 508, then the registrant can be given the option to skip the remaining challenges 510. If the registrant chooses to skip the remaining challenges 510, then the process is done 511. Otherwise, it loops back to issuing the next challenge 509. When the process is done 511, there is a possibility that the registrant has not provided a required number of responses. In that case, the registration can be accepted anyway, can be aborted, or the process can reissue previously skipped challenges.

Figure 6:
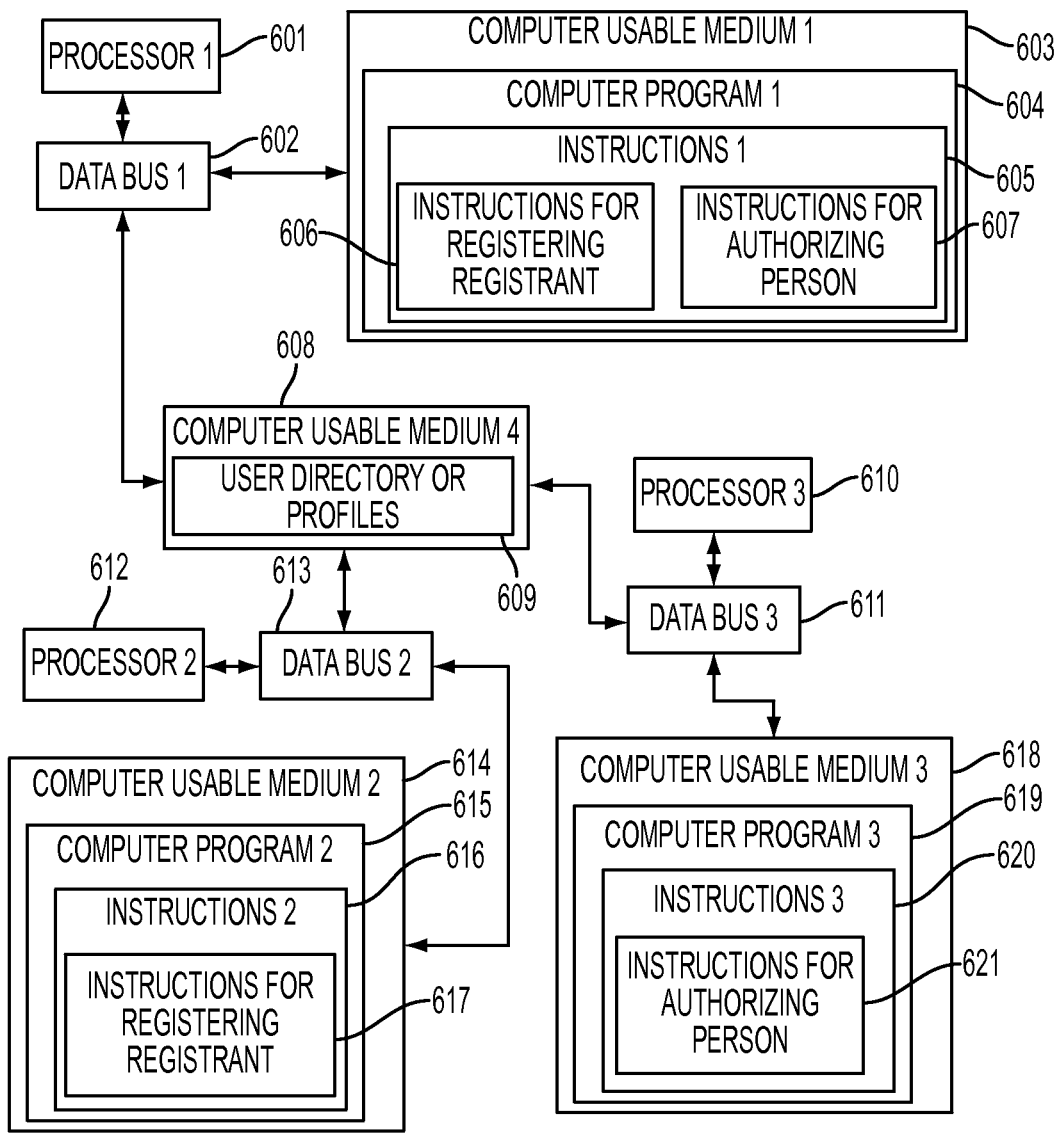
FIG. 6 illustrates processors accessing non-transitory memories to perform operations in accordance with aspects of the embodiments.

FIG. 6 illustrates processors 601, 610, 612 accessing non-transitory memories 603, 608, 614, 618 to perform operations in accordance with aspects of the embodiments. Some embodiments can have a single processor, data bus, and non-transitory storage device. Other embodiments can have multiple, possibly redundant, instances of hardware and software. Processor 1 601 can communicate with computer useable medium 1 603 and computer useable medium 4 608 by way of data bus 1 602. Processor 2 612 can communicate with computer useable medium 2 614 and computer useable medium 4 608 by way of data bus 2 613. Processor 3 610 can communicate with computer useable medium 3 618 and computer useable medium 4 608 by way of data bus 3 611. Note that the data buses herein are used to generically indicate communications links. Some communications links can tightly couple their endpoints such as with the signal lines on a computer motherboard. Other communications links can reach out over great distance such as through the internet.

Computer usable medium 1 603 is illustrated as holding computer program 1 604, having instructions 1 605 that include instructions for registering a registrant 606 and instructions for authorizing a person 607. Computer usable medium 2 614 is illustrated as holding computer program 2 615, having instructions 2 616 that include instructions for registering a registrant 617. Computer usable medium 3 618 is illustrated as holding computer program 3 619, having instructions 3 620 that include instructions for authorizing a person 621. Computer usable medium 4 608 is illustrated as holding a user directory or profiles 609. The profiles are stored in association with user identifiers. The illustration of varying memory contents is intended to show, in a non-limiting manner, that the various instructions and data can be spread out and/or duplicated across the communications network.

Figures 7, 8:
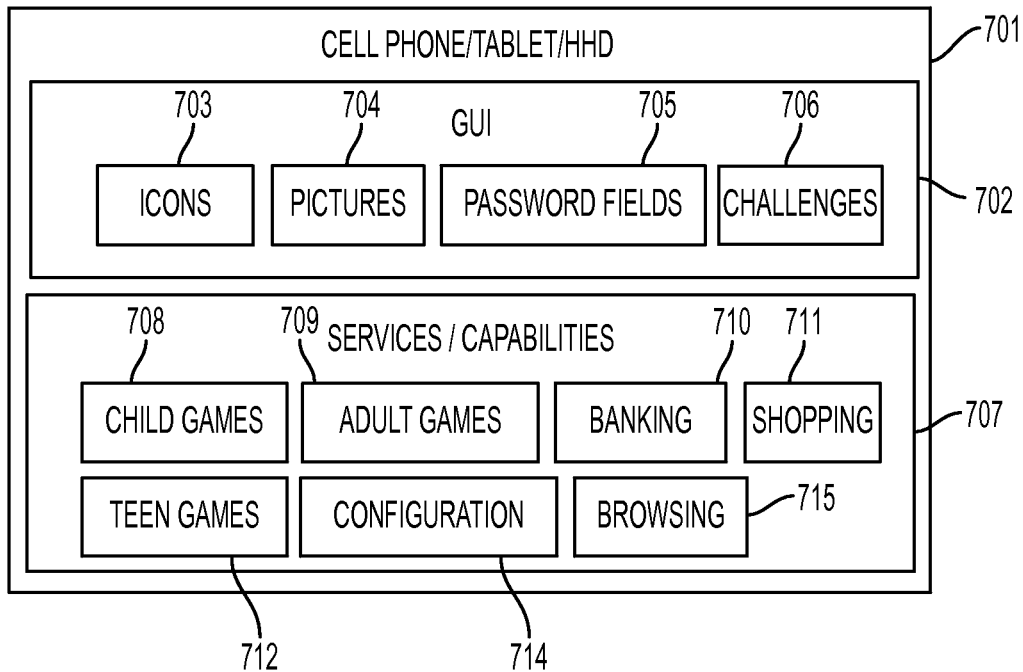
FIG. 7 illustrates graphical user interface elements used for accessing a device's services, data, and capabilities in accordance with aspects of the embodiments.
FIG. 8 illustrates confidence levels for determining access to a device's services, data, and capabilities in accordance with aspects of the embodiments.

FIG. 7 illustrates graphical user interface (GUI) elements 703-706 used for accessing a device's 701 services and capabilities 707 in accordance with aspects of the embodiments. The GUI 702 for logging on can include icons 703, pictures 704, password fields 705, and challenges 706. The password fields 705 can have inputs for a user name and for a password. Some embodiments do not display the password entry field until after the username is entered because some users have elected not to use passwords. Icons or pictures can be used in addition to or instead of user names. For example, the log on screen can present the pictures of two children and one user name entry field. The children can log in by selecting their own picture. An adult, having access to more of the devices capabilities, can opt to enter a user name. The challenges 706 have been previously described.

The device 701 provides users with a variety of services and capabilities 707. Different users can be given access to some services and to some capabilities, but not to others. The services and capabilities can include children's games 708, adult games 709, banking 710, shopping 711, teen games 712, web browsing 715, and device configuration 714. An aspect of device configuration can include creating classes of capabilities (such as child/teen/adult games etc.) and placing specific services/capabilities into classes. Embodiments can have numerous predefined classes such as those illustrated. Services and capabilities can preferentially add themselves to the predefined classes as they are installed.

FIG. 8 illustrates confidence levels for determining access to a device's services and capabilities in accordance with aspects of the embodiments. Subsets, as shown in subset table 801, can be used to combine services/capabilities 707 to thereby ease the task of determining who can access what. For example, an adult can have access to "All Games" which includes adult games, teen games, and child games. A teenager can instead have access to "Teen OK" which includes Teen Games and web browsing.

An access table 802 can determine when certain users are given access to certain capabilities. User 4, being a young child, has been configured to use challenge authentication and can gain access to children's games after a log-in attempt indicates at least a 50% confidence that the user is User 4. Two teenagers, User 2 and User 3, can access the Teen OK content if the log-in attempt gives at least a 70% confidence level. User 3, an older or more responsible teen, can also use the device 701 for shopping, but only if the log-in attempt gives at least a 90% confidence level. User 1, a responsible adult, can access "All Games" after scoring at least 80% and shopping after scoring at least 90%. Device configuration and banking, however, require perfection (100%). It is unlikely anyone can ever score 100% on challenges, but password authentication is either completely wrong (0%) or completely right (100%). As such, password authentication can be required for very high levels of access. In such an embodiment, User 1 can be provided with a log-in screen that offers both password and challenge authentication.

It will be appreciated that several of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A system comprising:
    at least one challenge, each challenge being answerable by a challenge response comprising at least one of producing a drawing, gesture, or sound;
    a processor and a data bus coupled to the processor;
    a plurality of user profiles associated with a plurality of users wherein each one of the user profiles is associated with one of the users by an identifier and comprises at least one challenge response provided by that one user and wherein one of the user profiles is associated with a registrant; and
    a non-transitory computer-usable medium coupled to the data bus wherein the computer usable medium embodies computer code, and wherein the computer program code comprises instructions executable by the processor and configured for:
        receiving a user identifier from a person wherein the user identification is associated with a specific user;
        presenting a plurality of authentication alternatives, the alternatives comprising password authentication and non-password authentication;
        receiving an authentication selection wherein the person selects non-password authentication;
        presenting the person with at least one of the challenges;
        recording the at least one challenge response provided by the person in response to the at least one challenge;
        computing a confidence level based on the person's at least one challenge response and on the at least one challenge response stored in one of the user profiles associated with the specific user;
        authenticating the person as the specific user if the confidence level exceeds a threshold;
        receiving the user identifier from the registrant;
        presenting the registrant with a plurality of authentication options wherein the authentication options comprise password authentication and non-password authentication;
        accepting a non-password authentication selection from the registrant; and
        presenting the registrant with at least one of the challenges and recording the registrant's at least one challenge response.

2. The system of claim 1 wherein the user identifier is a username comprising a plurality of characters.

3. The system of claim 1 wherein the user identifier is an icon.

4. The system of claim 1 wherein the user identifier is a picture of the requestor.

5. The system of claim 1 wherein the instructions are further configured for:
    receiving a password from the registrant; and
    associating a credential with the user identifier wherein the credential is based on the password.

6. The system of claim 1 wherein the instructions are further configured for:
    requiring the registrant to submit challenge responses to at least a minimum number of the challenges.

7. The system of claim 6 wherein the minimum number is greater than 1.

8. The system of claim 7 wherein the minimum number equals the number of challenges.

9. The system of claim 1 wherein the challenges comprise:
    a challenge to draw an animal identified by name;
    a challenge to draw an animal identified as favorite;
    a challenge to draw a number identified as favorite;
    a challenge to provide a name for a pictured animal; and
    a challenge to draw a number corresponding to the quantity of an item in a picture.

10. The system of claim 1 wherein the challenge responses comprise: a gesture; a drawing; and a selection of one picture from a plurality of pictures.

11. The system of claim 1,
    wherein the user identifier is a username comprising a plurality of characters, an icon, or a picture of the requestor;
    wherein the challenge responses comprise: a gesture; a drawing; and a selection of one picture from a plurality of pictures;
    wherein the system provides the person with access rights to a plurality of services and capabilities based on the confidence level with greater access rights being provided as a function of increasing confidence level;
    wherein the challenges comprise: a challenge to draw an animal identified by name; a challenge to draw an animal identified as favorite; a challenge to draw a number identified as favorite; a challenge to provide a name for a pictured animal; and a challenge to draw a number corresponding to the quantity of an item in a picture, and
    wherein the instructions are further configured for:
        receiving a password from the registrant;
        associating a credential with the user identifier wherein the credential is based on the password;
        requiring the registrant to submit challenge responses to all of the challenges; and
        increasing or decreasing the confidence level based on the person's challenge response when the person responds to another of the challenges.

12. A non-transitory processor-readable medium storing code representing instructions to cause a processor to perform a process to authenticate a person as a specific user wherein the instructions are configured to:
    access a plurality of challenges;
    access a plurality of challenge responses, each challenge response having been provided by one of a plurality of users in response to one of the challenges and wherein each challenge response is production of a drawing or a gesture;
    access a plurality of user profiles associated with the users wherein each one of the user profiles is associated with one of the users by an identifier and comprises at least one of those challenge responses provided by one of the users;

receive a user identifier from the person wherein the user identification is associated with the specific user;

present a plurality of authentication alternatives, the alternatives comprising password authentication and non-password authentication;

receive an authentication selection wherein the person selects non-password authentication;

present the person with at least one of the challenges;

record the at least one challenge response provided by the person in response to the at least one challenge;

compute a confidence level based on the person's at least one challenge response and on the at least one challenge response stored in one of the user profiles associated with the specific user;

authenticate the person as the specific user if the confidence level exceeds a threshold;

receive the user identifier from a registrant;

present the registrant with a plurality of authentication options wherein the authentication options comprise password authentication and non-password authentication;

accept a non-password authentication selection from the registrant; and presenting the registrant with at least one of the challenges and recording the registrant's at least one challenge response.

13. The processor-readable media of claim 12 wherein the code further comprises code to provide the person with access rights to a plurality of services, data, and capabilities.

14. The processor-readable media of claim 13 wherein the code further comprises code to provide the person with access rights to additional services and capabilities based on the magnitude of the confidence level.

15. A user authentication system comprising:

a plurality of challenges and a plurality of challenge responses wherein each of the challenges is answerable by a challenge response specific to that challenge and wherein each challenge response comprises at least one of producing a drawing or gesture;

a user profile generator that accepts a registrant identifier from a registrant, presents at least one of the challenges to the registrant, and records at least one registrant challenge response;

a user profile directory that stores a plurality of user profiles associated with a user identifier and comprising at least one user challenge response and wherein one of the user profiles is a registrant profile associated with the registrant identifier and comprising the at least one registrant challenge response;

a processor and a data bus coupled to the processor;

a non-transitory computer-usable medium coupled to the data bus wherein the computer usable medium embodies computer code, and wherein the computer code comprises instructions executable by the processor and configured for:

receiving a user identifier from a person wherein the user identification is associated with a specific user;

presenting a plurality of authentication alternatives, the alternatives comprising password authentication and non-password authentication;

receiving an authentication selection wherein the person selects non-password authentication;

presenting the person with at least one of the challenges;

recording the at least one challenge response provided by the person in response to the at least one challenge;

computing a confidence level based on the person's at least one challenge response and on the at least one challenge response stored in one of the user profiles associated with the specific user; and authenticating the person as the specific user if the confidence level exceeds a threshold.

16. The user authentication system of claim 15 further comprising:

a user authentication interface that receives a personal identifier from a person, provides the person with at least one of the challenges, and records at least one personal challenge response provided by the person; and a user authentication module that accepts and authenticates the person as a specific user based on the personal identifier, the at least one challenge response, and one of the user profiles associated with the specific user.

17. The user authentication system of claim 16 wherein the confidence level controls access to a plurality of subsets of a set of services and capabilities and wherein accessible subsets are based on the magnitude of the confidence level.

18. The user authentication system of claim 17 wherein the challenge responses comprise a gesture.

19. The user authentication system of claim 18 wherein the challenge responses comprise a drawing.

* * * * *

UNITED STATES PATENT AND TRADEMARK OFFICE
CERTIFICATE OF CORRECTION

| | | |
|---|---|---|
| PATENT NO. | : 9,122,850 B2 | Page 1 of 1 |
| APPLICATION NO. | : 13/759369 | |
| DATED | : September 1, 2015 | |
| INVENTOR(S) | : Francis Kapo Tse et al. | |

It is certified that error appears in the above-identified patent and that said Letters Patent is hereby corrected as shown below:

Title Page:
    Item (72) Inventors: Please add -- Patricia Swenton-Wall, Victor, NY (US) --.

Signed and Sealed this
Nineteenth Day of April, 2016

Michelle K. Lee
*Director of the United States Patent and Trademark Office*